(12) United States Patent
Yoshikawa

(10) Patent No.: US 7,477,312 B2
(45) Date of Patent: Jan. 13, 2009

(54) PHOTOGRAPHING APPARATUS, PHOTOGRAPHING METHOD, AND METHOD FOR MEASURING CONVERTED DATA REPRESENTING A FIBER-ARRAY IMAGE

(75) Inventor: Koichi Yoshikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 10/883,554

(22) Filed: Jul. 1, 2004

(65) Prior Publication Data
US 2005/0030406 A1 Feb. 10, 2005

(30) Foreign Application Priority Data
Jul. 4, 2003 (JP) ............................. 2003-192372

(51) Int. Cl.
*H04N 5/225* (2006.01)
*H04N 7/00* (2006.01)
*G02B 6/06* (2006.01)

(52) U.S. Cl. ......................... 348/359; 348/39; 385/116

(58) Field of Classification Search ................ 348/359, 348/39; 385/116
See application file for complete search history.

(56) References Cited

U.S. PATENT DOCUMENTS

| 4,323,925 | A | * | 4/1982 | Abell et al. | ................. 348/340 |
| 5,508,734 | A | * | 4/1996 | Baker et al. | ................... 348/36 |
| 5,838,865 | A | * | 11/1998 | Gulick | ....................... 385/121 |
| 6,459,451 | B2 | * | 10/2002 | Driscoll et al. | .............. 348/335 |
| 7,171,088 | B2 | * | 1/2007 | Koyama et al. | ............. 385/116 |

FOREIGN PATENT DOCUMENTS

| JP | 49 40564 | 4/1974 |
| JP | 63 96618 | 4/1988 |
| JP | 1 227577 | 9/1989 |
| JP | 7 87371 | 3/1995 |
| JP | 8 55215 | 2/1996 |
| JP | 10 253841 | 9/1998 |
| JP | 11 510342 | 9/1999 |
| JP | 2000 175087 | 6/2000 |
| JP | 2000 261705 | 9/2000 |
| JP | 2001 223922 | 8/2001 |
| WO | WO 01 63915 | 8/2001 |

* cited by examiner

*Primary Examiner*—Tuan Ho
*Assistant Examiner*—Dillon Dumford-Geszvain
(74) *Attorney, Agent, or Firm*—Frommer Lawrence & Haug LLP; William S. Frommer; Paul A. Levy

(57) ABSTRACT

A 360°-image is formed on the object-side surface (dough-nut-shaped) 15 of an optical fiber array 13. The image is applied from the element-side surface 16 of the array, which is substantially rectangular, to an imaging element 11 that is rectangular. The image that has been photographed is converted in accordance with the image signals generated at the object-side surface. Hence, the entire surface of the imaging element 11 can serve as effective photographing region. In addition, the image of the camera, which is formed on the center part of the object-side surface 15, is not transmitted to the imaging element 11.

8 Claims, 13 Drawing Sheets

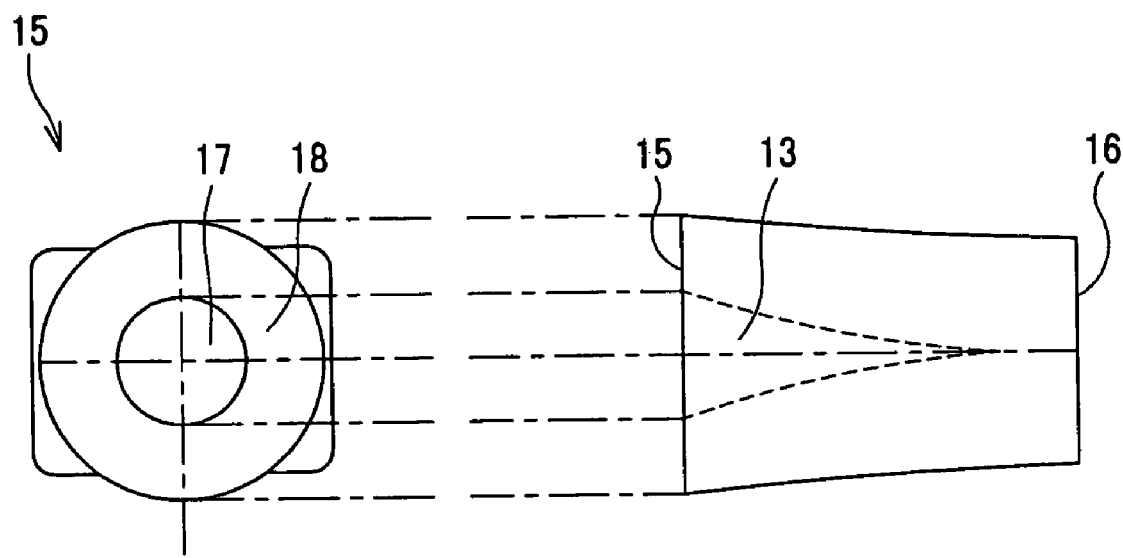
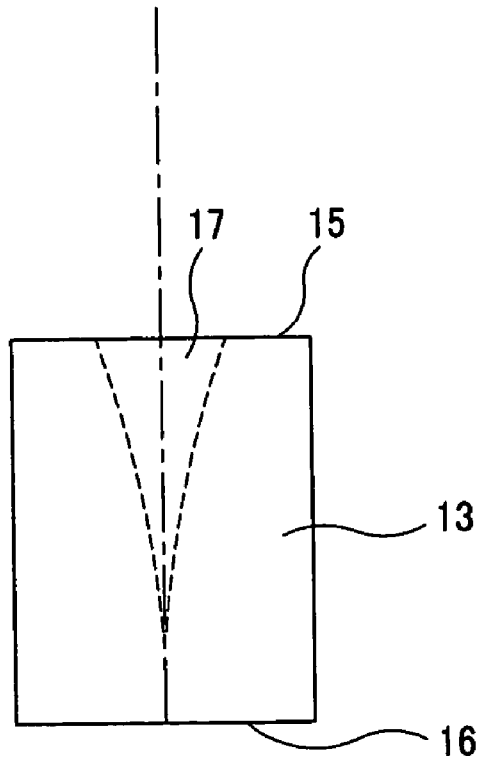
FIG.4A  FIG.4C
FIG.4B

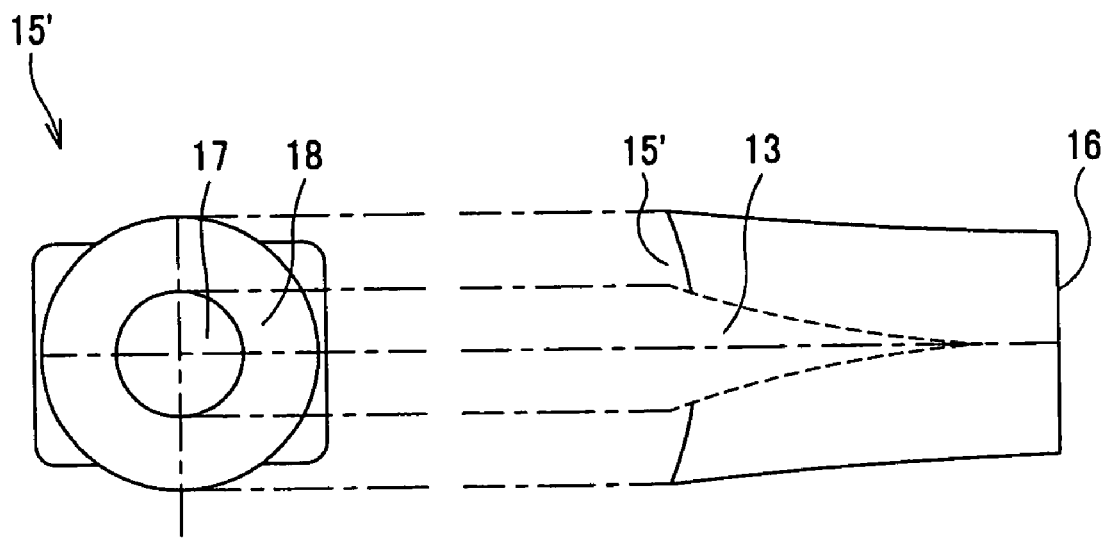
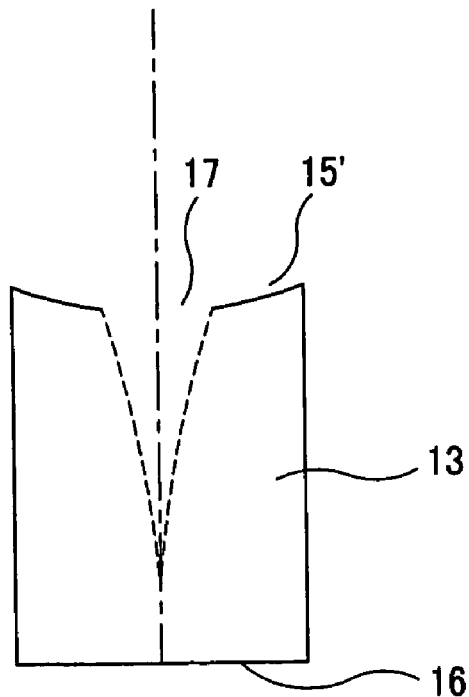
FIG. 15A  FIG. 15C  FIG. 15B

PHOTOGRAPHING APPARATUS, PHOTOGRAPHING METHOD, AND METHOD FOR MEASURING CONVERTED DATA REPRESENTING A FIBER-ARRAY IMAGE

BACKGROUND OF THE INVENTION

1. Field of the Invention

The present invention relates to a photographing apparatus and a photographing method, which can provide wide-angle images, and also to a method of measuring converted data representing a fiber-array image.

2. Description of the Related Art

In recent years, solid-state imaging elements have acquired an increased resolution and can yet be manufactured at a decreased cost. This is why digital still cameras and digital video cameras, each incorporating a solid-state imaging element are used in increasing numbers. To obtain wide-angle images, such as 360°-images, with such a camera, various methods have been used. In one method disclosed in Jpn. Pat. Appln. Laid-Open Publication No. 2001-223922, a curved mirror 52 is arranged in front of the photographing lens 51 as FIG. 1 shows, to focus a 360°-image on an imaging element 53. In another method, a super-wide-angle lens such as a fish-eye lens having an approximately 180°-angle of field is used to focus a 360°-image on an imaging element.

These methods cannot make an effective use of the area that the imaging element has, however. Most imaging elements are rectangular. FIG. 2 shows a common imaging element 53a and a common imaging element 53b that shows a ratio of 16:9. When a curved mirror or a fish-eye lens is used, an effective image can be photographed in only a circular region 54a of the imaging element 53a and a circular region 54b of the imaging element 53b. That is, only 60% of the area that the element 53a has is utilized, and only 44% of the area that the element 53b has is utilized. No matter whether the curved mirror or the fish-eye lens is used, an image of the camera is focused at the center part of the imaging element. Inevitably, the region effectively used further decreases.

SUMMARY OF THE INVENTION

The present invention has been made in view of the foregoing. An object of the invention is to provide a photographing apparatus and a photographing method, which can much improve the use efficiency of a rectangular imaging element even when the element serves to provide 360°-images, thereby to achieve the photographing of high-resolution, wide-angle images.

Another object of this invention is to provide a method of measuring converted data representing a fiber-array image. This method is designed for use in a photographing apparatus that has an imaging element, a photographing lens and an optical fiber array arranged between the imaging element and the photographing lens and comprising a plurality of single optical glass fibers bundled together. The method can easily measure the coordinate position of an image signal at the element-side surface of each optical fiber, which corresponds to the position of the image signal at the object-side surface of the optical fiber.

To achieve the first object mentioned above, a photographing apparatus according to the invention comprises: an imaging element; a reflecting member provided between an object and the imaging element; and an optical fiber array provided between the imaging element and the reflecting member and formed by bundling a plurality of single optical fibers. In the apparatus, an image-focusing member is provided between the reflecting member and the optical fiber array, has an annular effective photographing region and forms an annular image in the effective photographing region. The optical fiber array has an object-side surface that is shaped almost annular like the image formed in the effective photographing region. The optical fiber array has an element-side surface which differs in shape from the object-side surface; and an image-data converting means for converting image data obtained at the element-side surface in accordance with positions where image signals are acquired at the object-side surface of the single optical fibers which constitute the optical fiber array.

In the photographing apparatus, the image-data converting means converts image data obtained at the element-side surface in accordance with positions where image signals are acquired at the object-side surface of the single optical fibers that constitute the optical fiber array. Thus, the pixels of the imaging element can be used with high efficiency even if the element-side surface of the optical fiber array differs in shape from the object-side surface (which is annular). The apparatus can therefore provide wide-angle images.

Another photographing apparatus according to the invention is designed to photograph wise-angle images. This apparatus comprises: an imaging element; a photographing lens; and an optical fiber array provided between the imaging element and the photographing lens and formed by bundling a plurality of single optical fibers. In this apparatus, an image formed in an effective photographing region by an image-focusing member is annular. The optical fiber array has an object-side surface that is shaped almost annular like the image. The optical fiber array has an element-side surface that differs in shape from the object-side surface. The image-data converting means converts image data obtained at the element-side surface in accordance with positions where image signals are acquired at the object-side surface of the single optical fibers that constitute the optical fiber array.

In this photographing apparatus, the image data obtained at the element-side surface is converted in accordance with positions where image signals are acquired at the object-side surface of the single optical fibers that constitute the optical fiber array. Thus, the pixels of the imaging element can be used with high efficiency even if the element-side surface of the optical fiber array differs in shape from the object-side surface (which is annular). The apparatus can provide wide-angle images.

A photographing method according to this invention is designed to photograph an image of an object by using an optical fiber array provided between an imaging element and an image-focusing member and having an element-side surface and an object-side surface which differ in shape. The method comprises an image-data converting step of converting image data obtained at the element-side surface in accordance with positions where image signals are acquired at the object-side surface of the single optical fibers that constitute the optical fiber array.

In the photographing method, the image-data converting step converts the image data obtained at the element-side surface in accordance with positions where image signals are acquired at the object-side ends of the single optical fibers that constitute the optical fiber array. Therefore, the pixels of the imaging element are used with high efficiency even if the element-side surface of the optical fiber array differs in shape from the object-side surface (which is annular). Hence, the method can provide wide-angle images.

A method of measuring converted data representing a fiber-array image, according to this invention, is for use in a photographing apparatus having an imaging element, a focusing member and an optical fiber array comprising a plurality of single optical fibers, provided between the imaging element and the focusing member and having an element-side surface and an object-side surface which differ in shape. The method is designed to determine coordinate positions where image signals are acquired at the element-side surface. In the method, light is transmitted in units of pixels to the single optical fibers by using a light valve means positioned at the element-side surface that is rectangular. The positions where image signals can be detected at the object-side surface are determined. The coordinate positions of image signals supplied from the element-side surface are measured on the basis of the positions determined.

The method of measuring converted data representing a fiber-array image can easily determine the coordinate positions of image signals supplied from the element-side surface, which correspond to the image signals obtained at the object-side surface of the single optical fibers that constitute the optical fiber array.

In the photographing apparatus according to this invention, the image-data converting unit converts the image data which has been generated at the element-side surface of the optical fiber array composed of single optical fibers and which represents the image formed on the object-side surface of the optical fiber array. Thus, the pixels of the imaging element are efficiently used to photograph wide-angle images, even if the element-side surface of the optical fiber array differs in shape from the object-side surface (which is annular). This greatly improves the use efficiency of a rectangular imaging element even when the element serves to provide 360°-images. The photographing apparatus can therefore provide high-resolution, wide-angle images.

In the photographing method according to this invention, the image-data converting step converts the image data which has been generated at the element-side surface of the optical fiber array composed of single optical fibers and which represents the image formed on the object-side surface of the optical fiber array. The pixels of the imaging element are efficiently used to photograph wide-angle images, even if the element-side surface of the optical fiber array differs in shape from the object-side surface (which is annular). This greatly improves the use efficiency of a rectangular imaging element even when the element serves to provide 360°-images. The photographing method can therefore provide high-resolution, wide-angle images.

The method of measuring converted data representing a fiber-array image can easily determine the coordinate positions which the single optical fibers of an optical fiber array assumes at the element-side surface of the array and which correspond to the positions which the fibers assume at the object-side surface of the array.

BRIEF DESCRIPTION OF THE DRAWINGS

FIGS. 4A, 4B and 4C are top, front and side views of an optical fiber array, respectively;

FIG. 15 is front, side and top views of the optical fiber array whose object-side surface is curved.

DETAILED DESCRIPTION OF THE PREFERRED EMBODIMENTS

Figure 1:
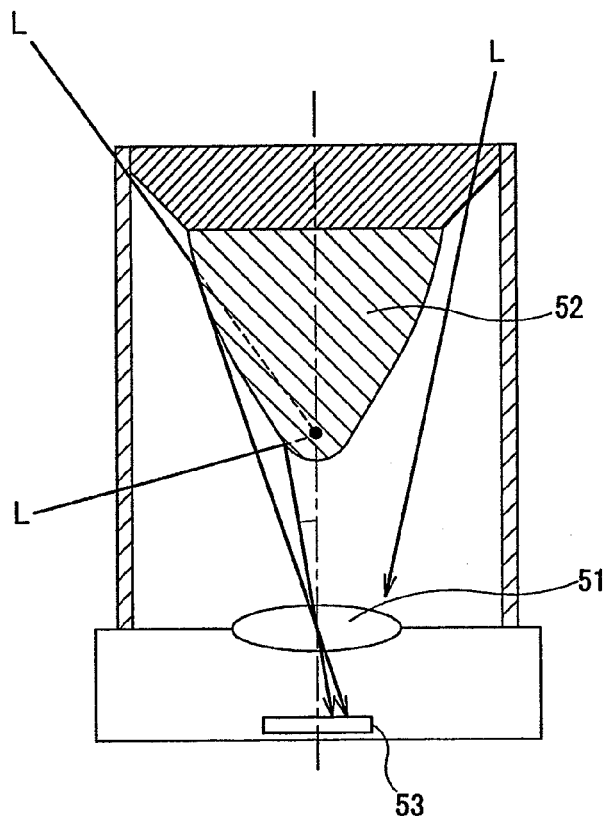
FIG. 1 is a diagram showing the structure of a conventional wide-angle photographing apparatus.
Figure 2:
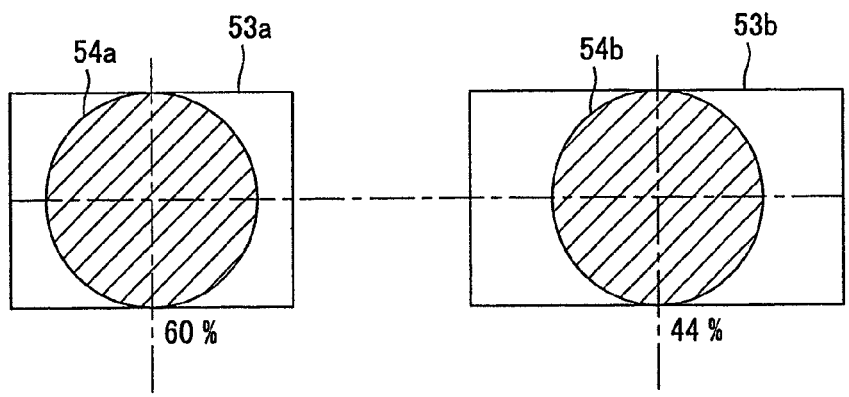
FIG. 2 is a diagram showing the regions of two imaging elements, which are effectively used in the conventional wide-angle photographing apparatus.

An embodiment of the present invention will be described, with reference to the accompanying drawings. The embodiment is a wide-angle photographing apparatus 10 shown in FIG. 3. The photographing apparatus 10 can provide wide-angle images such as 360°-images. The wide-angle photographing apparatus 10 has an imaging element 11 and a curved mirror 12. The curved mirror 12 is arranged between the imaging element 11 and an object of photography (not shown). The apparatus 10 further has a photographing lens 14 and an optical fiber array 13, which are interposed between the imaging element 11 and the curved mirror 12. The photographing lens 14 is provided between the curved mirror 12 and the optical fiber array 13.

Figure 3:
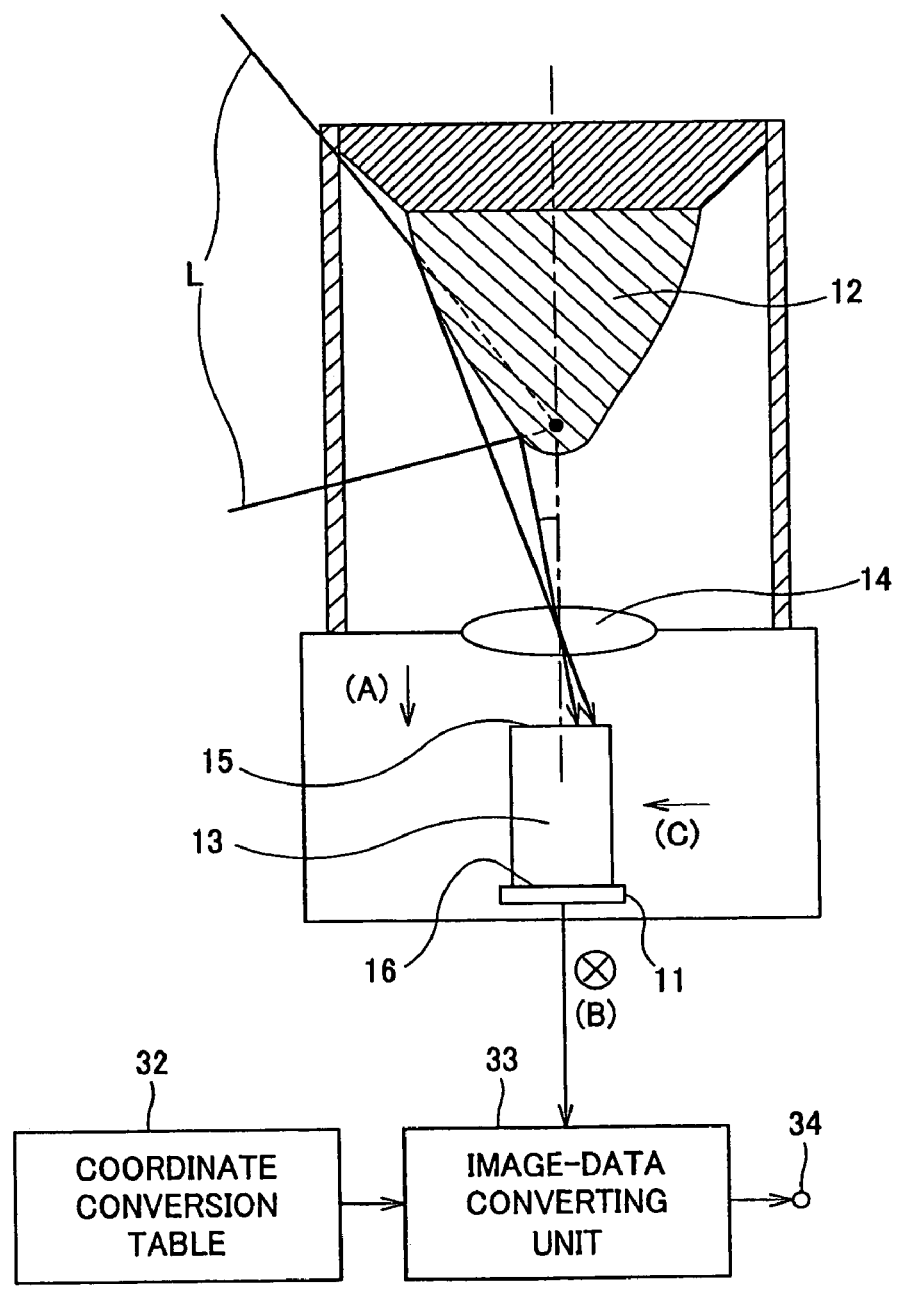
FIG. 3 is a diagram illustrating the structure of a wide-angle photographing apparatus.

As FIG. 3 shows, the curved mirror 12 reflects light L coming from the object in the wide-angle photographing apparatus 10. The light L passes through the photographing lens 14. The light L is thereby focused on an object-side surface 15 of the optical fiber array 13, forming an image. The image thus formed is transferred by the single optical fibers that constitute the optical fiber array 13. The image, i.e., light beams, are applied to the imaging element 11 from an element-side surface 16 of the optical fiber array 13.

The object-side surface 15 of the optical fiber array 13 is shaped like a doughnut. This is because the image of the object, which the photographing lens 14 (i.e., focusing member) forms in its effective photographing region is shaped like a doughnut. Note that the element-side surface 16 of the optical fiber array 13 is not doughnut-shaped; it is substantially rectangular like the imaging element 11.

FIG. 4A is a top view of the optical fiber array, as seen from the photographing lens or in the direction of an arrow (A) shown in FIG. 3. FIG. 4B is a front view of the array, as seen at right angles to the plane of the drawing or in the direction of a point (B) shown in FIG. 3. FIG. 4C is a side view of the array, as seen in the direction of an arrow (C) shown in FIG. 3.

The image of the camera is projected on the center part of the object-side surface 15 of the optical fiber array 13. The center part of the surface 15 cannot be used as a region for effectively photographing a 360°-image of the object. Consequently, the object-side surface 15 of the optical fiber array 13 has a doughnut-shaped, effective photographing region 18. That is, the optical fiber array 13 has a hole 17. The light focused at the hole 17 does not reach the imaging element 11. An image of any object present around the camera is formed on the doughnut-shaped effective photographing region 18.

Figure 5:
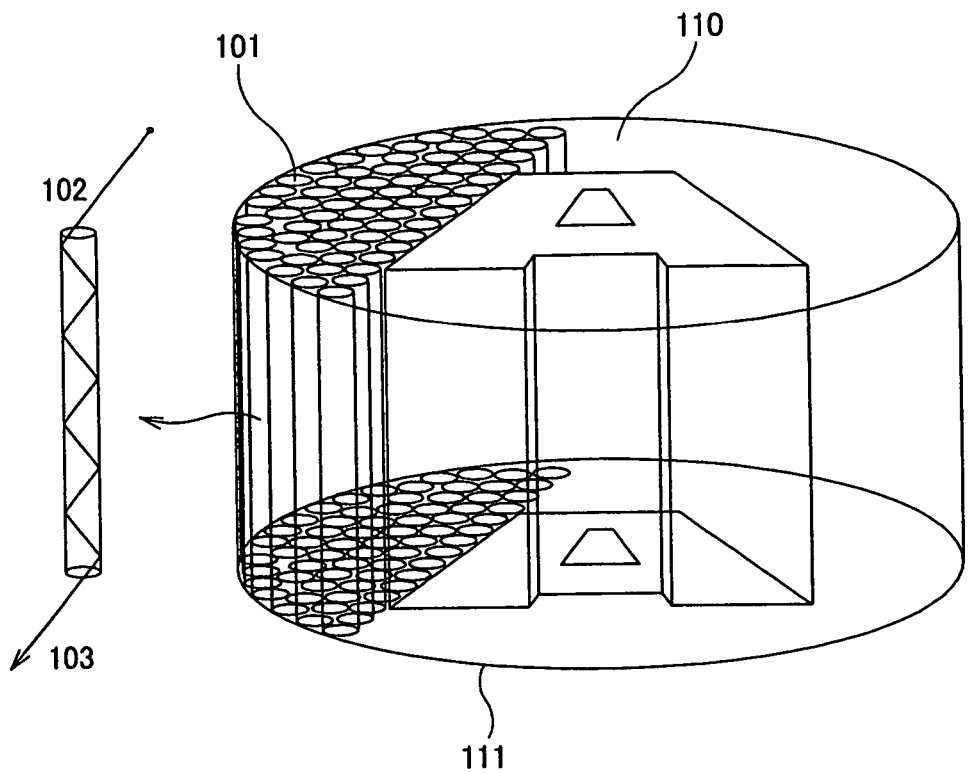
FIG. 5 is a diagram showing the structure of the optical fiber array.
Figure 6:
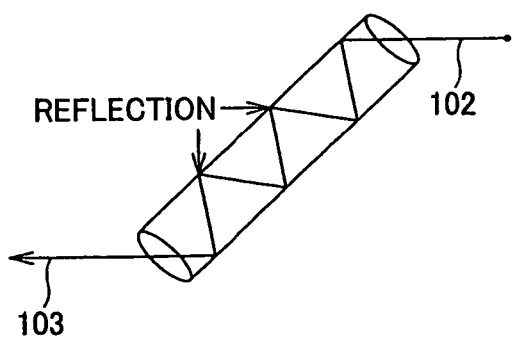
FIG. 6 is a diagram explaining a single optical glass fiber.

An optical fiber array 100 will be described in terms of basic structure and operating principle, with reference to FIGS. 5 and 6. As FIG. 5 shows, the array 100 is a bundle of single optical fibers 101, each a few microns thick. The light applied to an input surface 110 of the array 100 propagates to an output surface 111 of the array 100. As FIG. 6 shows, each single optical fiber 101 comprises a glass core and a glass clad like the ordinary optical fibers. The core has a high refractive index. The clad has a low refractive index and covers the core. Each optical fiber 101 transmits a light beam from its input end 102 to its output end 103. More precisely, the light beam repeatedly undergoes total reflection at the interface between the glass core and the glass clad, thus propagating through the fiber 101. Hence, the image formed on the input surface 110 of the optical fiber array 100 is transmitted to the output surface 111 of the array 100.

The imaging element 11 has a plurality of photosensors, which are arranged in rows and columns and which function as pixels. The single optical fibers of the optical fiber array 13 are connected to the pixels, respectively. The inter-axis pitch of the single optical fibers, i.e., the distance between the axis of each fiber and any adjacent fiber, is the same as the pixel pitch at which the pixels are arranged. The inter-axis pitch may be shorter than the pixel pitch. Thus, the optical fiber array 13 can transmit images, without degrading the quality of the images. The gaps between the single optical fibers are filled with light-absorbing or -shielding material so that any light beam that is not totally reflected at the interface between the glass core and glass clad of any single optical fiber may not reach any adjacent single optical fiber.

As shown in FIG. 4, the effective photographing region 18 at the object-side surface 15 of the optical fiber array 13 is shaped like a doughnut, and the element-side surface 16 of the optical fiber array 13 is substantially rectangular. Consequently, an image of letter A at the input surface 110 does not appear at the output surface 111 without being deformed as shown in FIG. 5.

In view of this, a coordinate conversion table 32 and an image-data converting unit 33 are used as is illustrated in FIG. 3. The table 32 is generated from the conversion data obtained by a method according to this invention, which measures converted data representing a fiber-array image. Using the coordinate conversion table 32 thus generated, the image-data converting unit 33 performs coordinate conversion on the image signal supplied from the imaging element 11. That is, the image-data converting unit 33 generates an image signal representing the image that the photographing lens 14 focuses on the object-side surface 15 of the optical fiber array 13. The image signal generated by the unit 33 is output from the output terminal 34.

Figure 7:
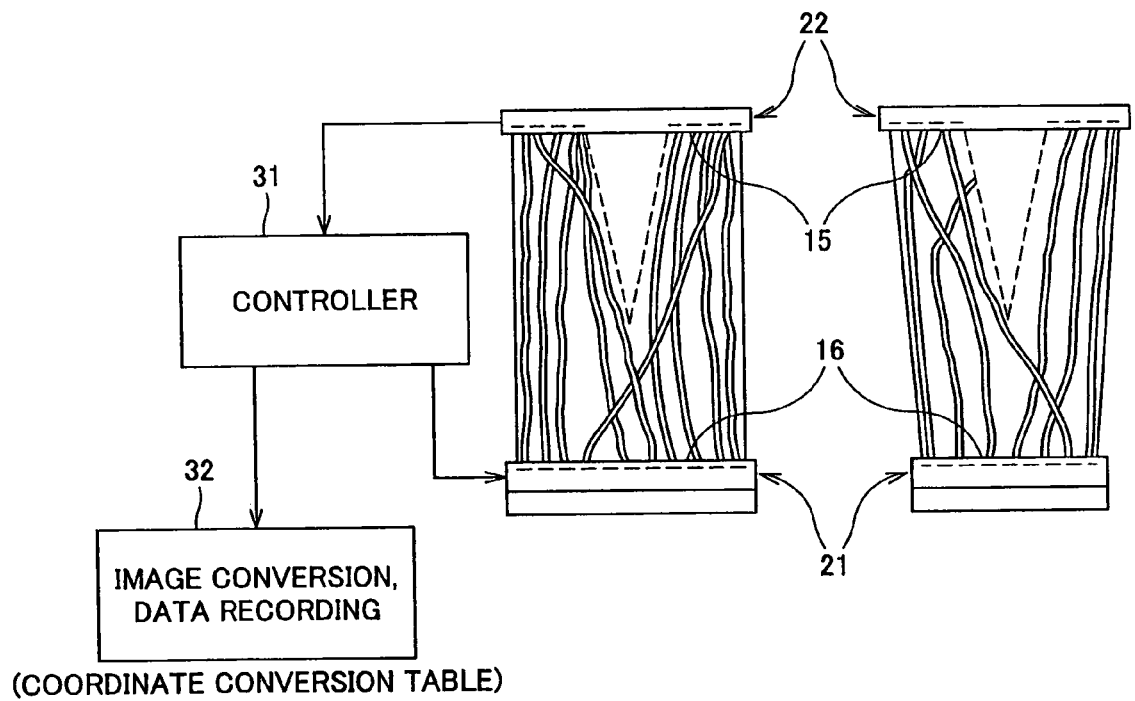
FIG. 7 is a schematic representation of a method of measuring converted data representing a fiber-array image.
Figure 8:
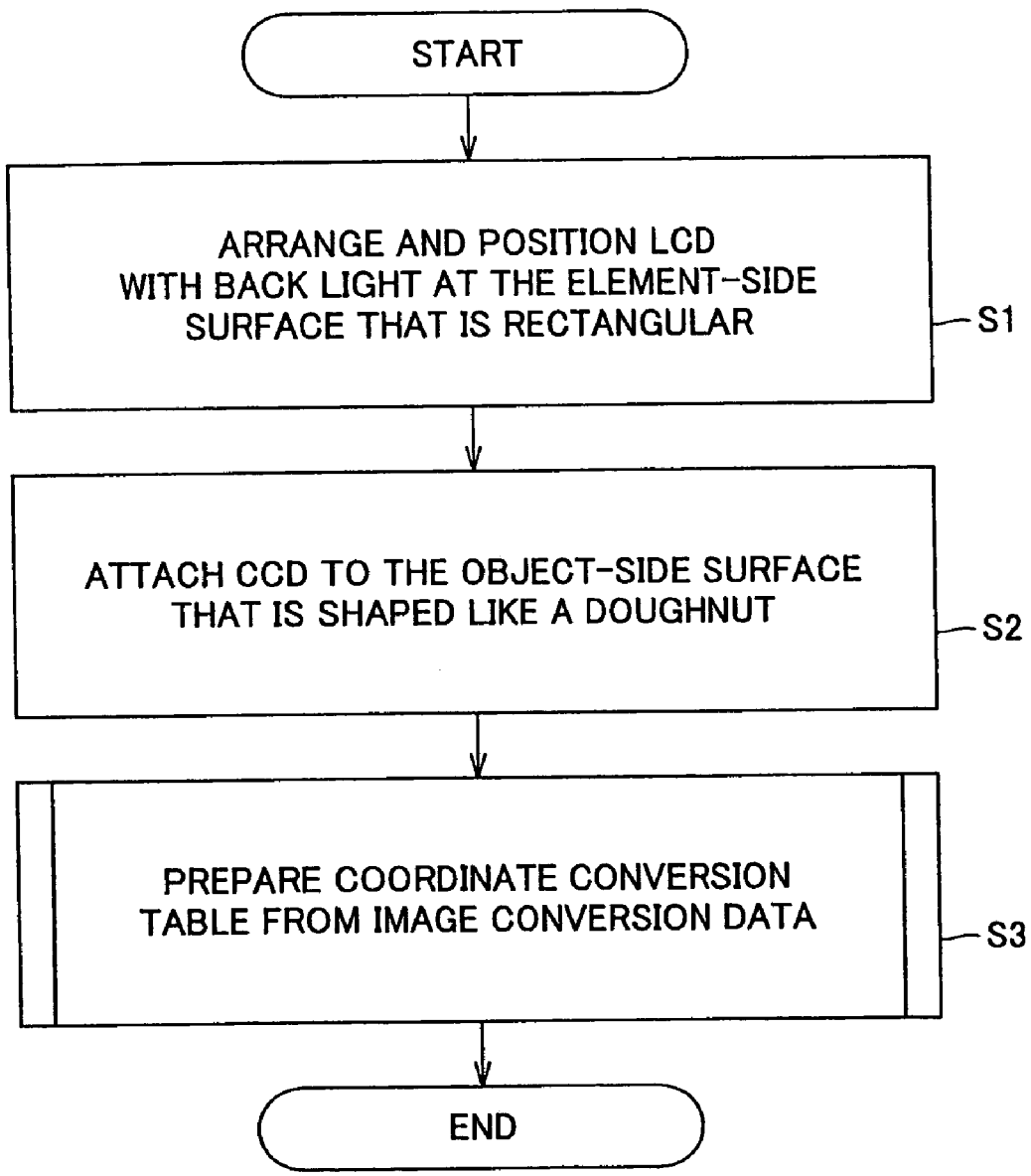
FIG. 8 is a flowchart depicting the sequence of a method of measuring converted data representing a fiber-array image.

FIG. 7 is a diagram that illustrates the method of measuring converted data representing a fiber-array image. FIG. 8 shows the sequence of measuring converted data representing a fiber-array image. First, an LCD 21 with a back light is arranged and positioned at the element-side surface 16 of the optical fiber array 13, which is rectangular (Step S1). Meanwhile, a CCD 22 is attached to the object-side surface 15 of the optical fiber array 13, which is shaped like a doughnut (Step S2). The CCD 22 is large, fully covering the object-side surface 15. In this condition, a controller 31 controls the LCD 21 with a back light at the element-side surface 16, sequentially turning on some pixels, one at a time, and not turning on the remaining pixels. The CCD 22 detects the light emitted from any pixel turned on. The CCD 22 can determine which part of the doughnut-shaped object-side surface 15 is emitting light. Thus, the CCD 22 provides conversion data, form which a coordinate conversion table 32 is prepared (Step S3).

Note that both the LCD 21 at the element-side surface 16 of the optical fiber array 13 and the CCD 22 attached to the object-side surface 15 of the optical fiber array 13 should have a short pixel pitch. In the present embodiment, the pixel pitches of the LCD 21 and CCD 22 are shorter than the inter-axis pitch of the single optical fibers.

Figure 9:
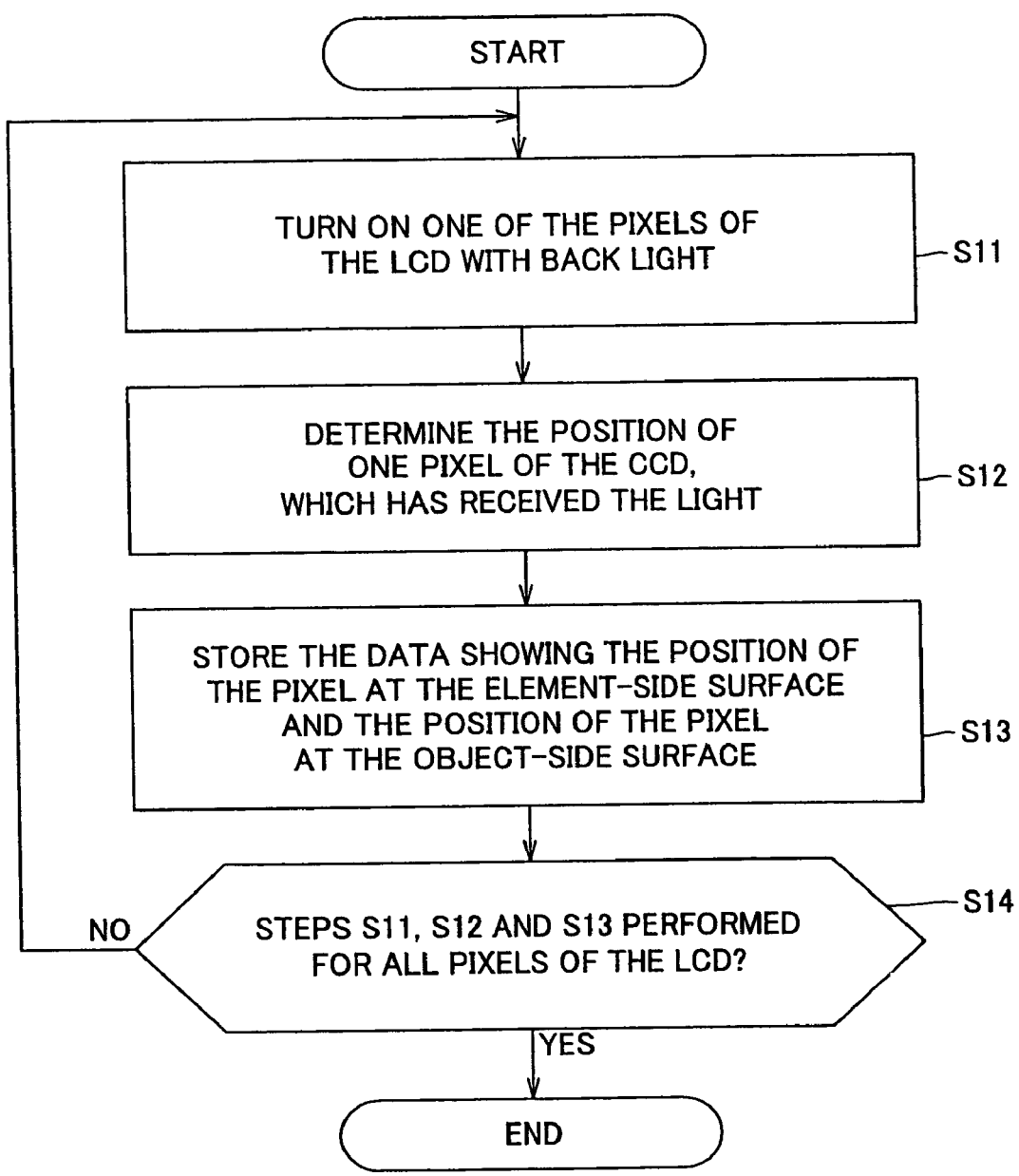
FIG. 9 is a flowchart explaining, in detail, the sequence of the method of measuring converted data representing a fiber-array image.

FIG. 9 shows, in detail, sequence (i.e., Step S3 in FIG. 8) of preparing the coordinate conversion table. First, one of the pixels of the LCD 21 with the back light, which is provided at the element-side surface 16 of the optical fiber array 13, is turned on (Step S11). One of the pixels of the CCD 22 attached to the object-side surface 15 of the optical fiber array 13 receives the light emitted from the pixel of the LCD 21. The position of this pixel of the CCD 22 is determined (Step S12). The data representing the position of the pixel at the element-side surface 16 and the position of the pixel at the object-side surface 15 is stored in, for example, a ROM (Step S13). Steps S11, S12 and S13 are repeated for the other pixels of the LCD 21, each time for one pixel, until it is determined in Step S14 that the all pixels are subjected. The coordinate conversion table 32 is thereby prepared.

The image-data converting unit 33 uses the coordinate conversion table 32, performing the coordinate conversion on the image signal supplied from the imaging element 11. Thus, the image-data converting unit 33 generates an image signal representing the image formed on the element-side surface 16, which corresponds to the image focused on the object-side surface 15.

Figure 10:
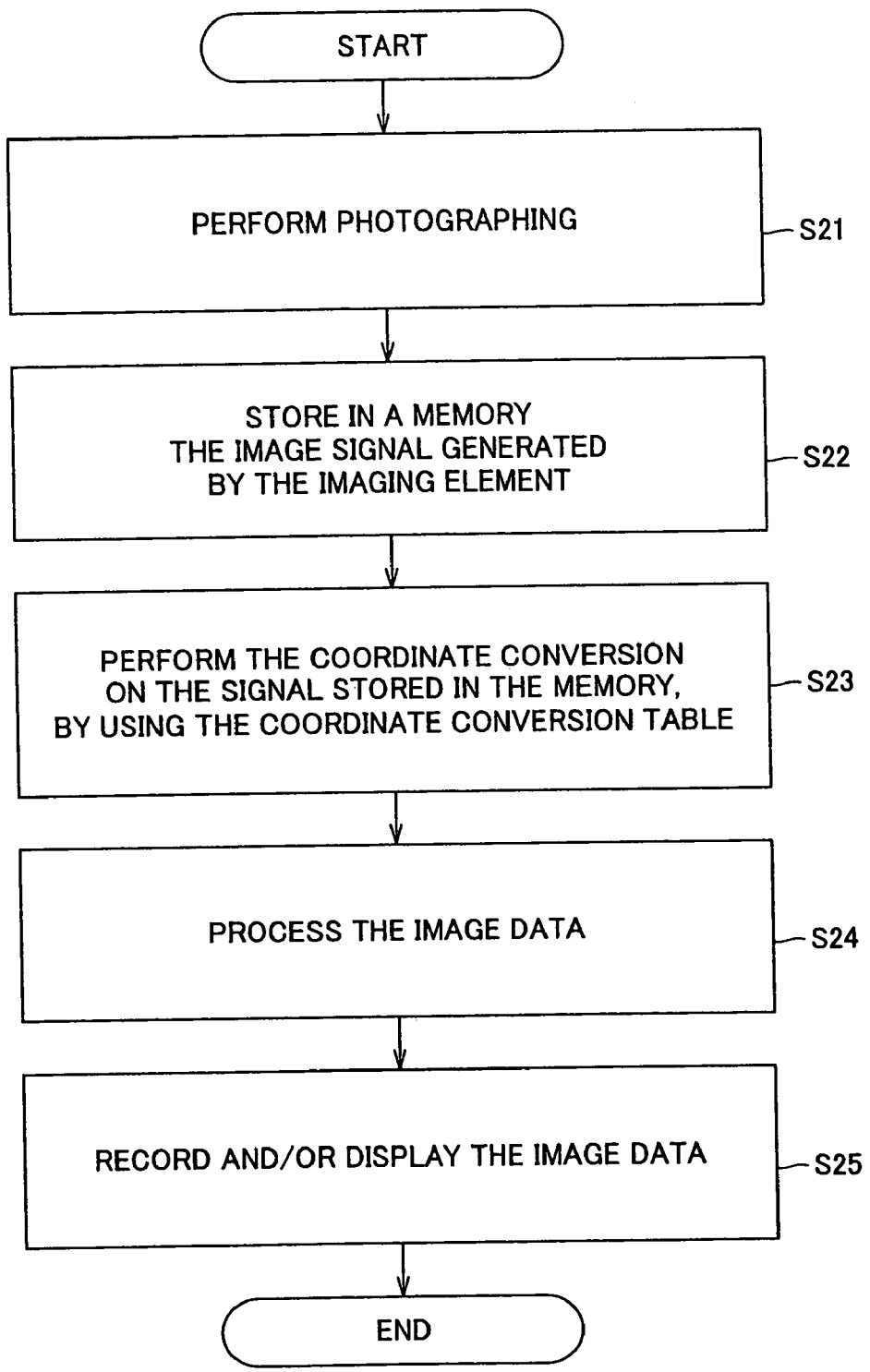
FIG. 10 is a flowchart depicting the sequence of a method of photographing images, performed by a wide-angle photographing apparatus.

That is, in Step S21 shown in FIG. 10, the curved mirror 12 of the wide-angle photographing apparatus 10 reflects the light coming from the object. The light passes through the photographing lens 14 and is focused on the object-side surface 15 (shaped like a doughnut) of the optical fiber array 13. An image of the object is thereby formed on the object-side surface 15 of the optical fiber array 13. The optical fiber array 13 composed of single optical fibers transmits the image to its element-side surface 16 that is substantially rectangular. The image is applied to the imaging element 11.

The imaging element 11 converts the image into an electric signal, or image signal, which is the combination of the outputs of the photosensors arranged in rows and columns and corresponding to the pixels. The image signal is stored in a video memory that is, for example, a semiconductor memory (Step S22).

The image signal thus stored in the video memory represents an image that is different from the image focused on the doughnut-shaped, object-side surface 15. This is because the element-side surface 16 of the optical fiber array 13 is substantially rectangular. Thus, the image-data converting unit 33 performs coordinate conversion on the image signal stored in the video memory, so that the signal may represent the image focused on the object-side surface 15 (Step S23). To perform the coordinate conversion, the unit 33 uses the coordinate conversion table 32 prepared by the method of measuring converted data representing a fiber-array image, according to the present invention. Next, the image signal subjected to the coordinate conversion undergoes a prescribed image-processing (Step S24). The image signal is then recorded in a recording medium such as a semiconductor memory, supplied to a display such as an LCD, which displays the image, or supplied to a printer, which prints the image (Step S25). Needless to say, the signal can be recorded and the image can be displayed or printed, at the same time.

In the wide-angle photographing apparatus 10 described above, it is known how the image formed on the object-side surface 15 shaped like a doughnut will be deformed when the light is emitted from the element-side surface 16 that is substantially rectangular. A computer may use the data showing this, to deform the image photographed. Thus, the apparatus 10 can reproduce images that look natural to people.

That is, the image formed on the object-side surface 15 (shaped like a doughnut) of the optical fiber array 13 is applied from the element-side surface 16, which is substantially rectangular, to the imaging element 11 that is rectangular. The image-data converting unit 33 converts the image to one that corresponds to the image formed on the object-side surface 15. Hence, all area of the imaging element 11 can serve as effective photographing region. In addition, the image of the camera, which is formed on the center part of the object-side surface 15, is not transmitted to the imaging element 11.

Figure 11:
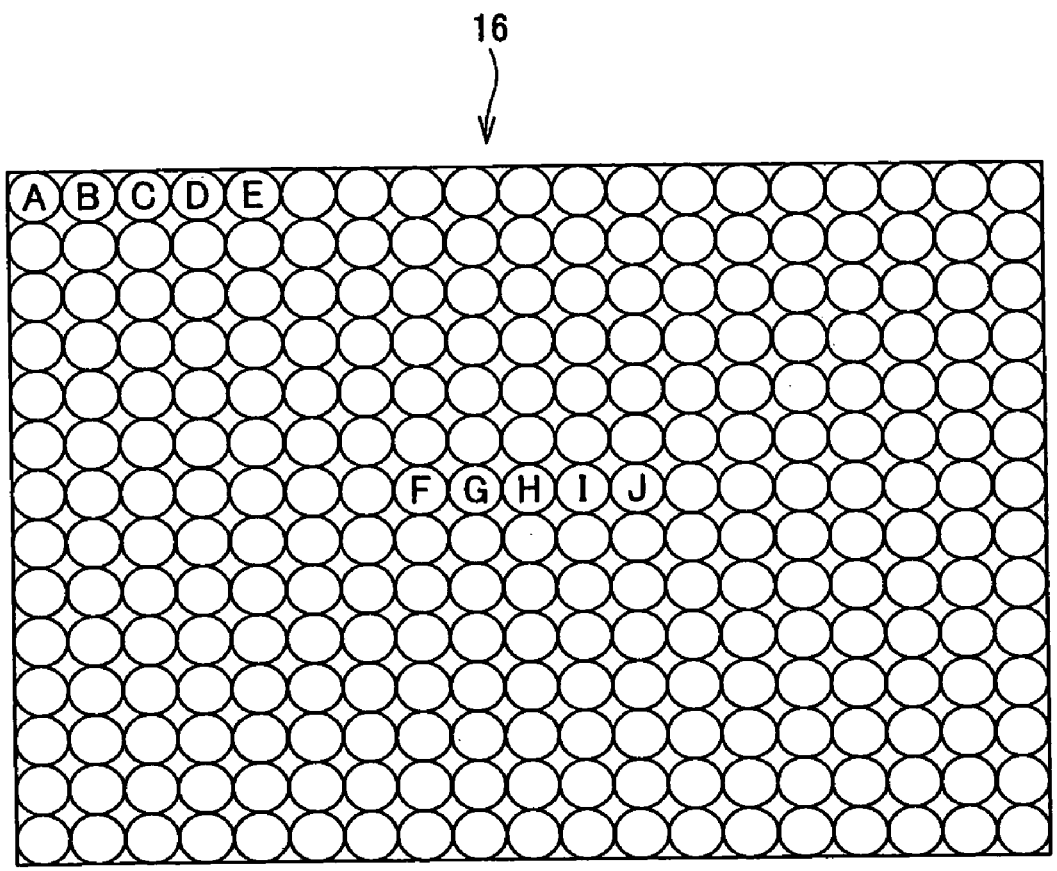
FIG. 11 is a diagram showing the element-side surface of an optical fiber array.
Figure 12:
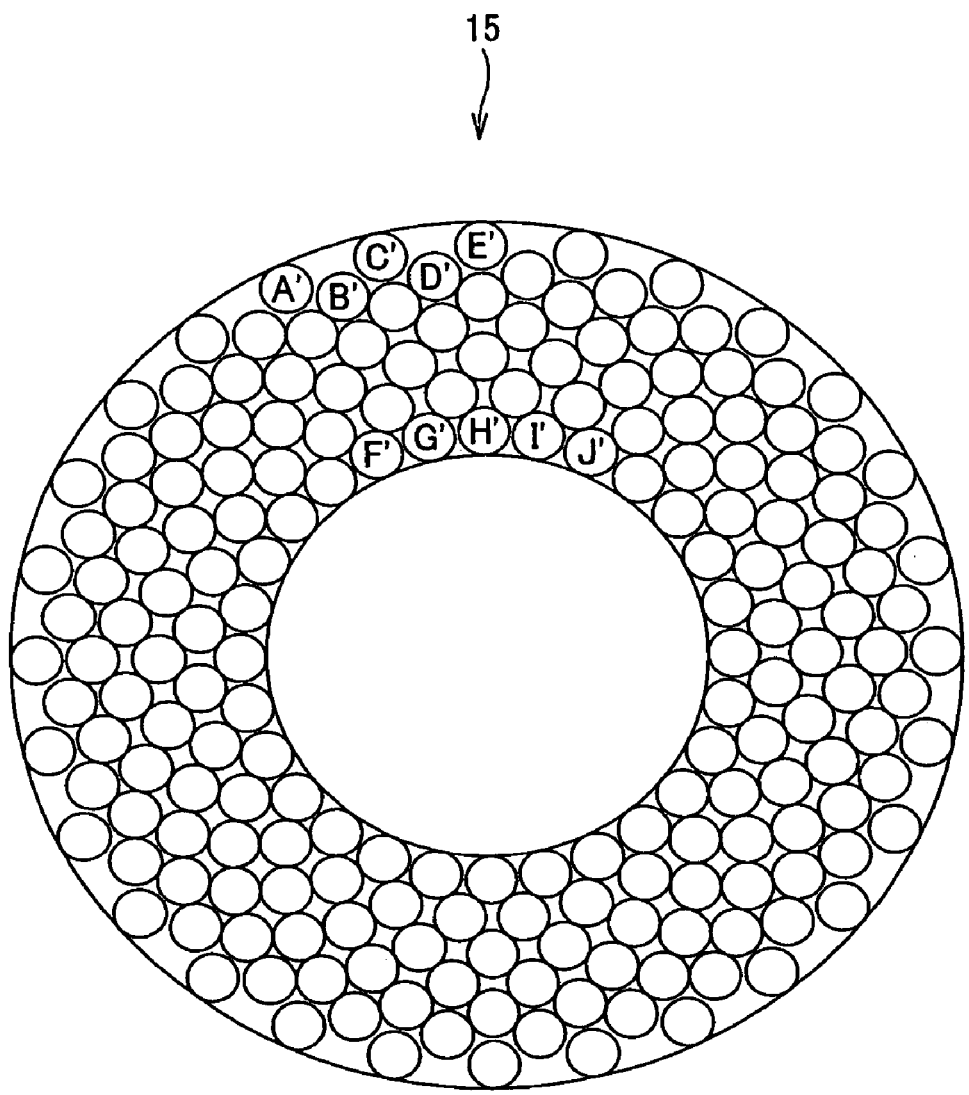
FIG. 12 is a diagram depicting the object-side surface of the optical fiber array.

How the apparatus 10 operates will be described in greater detail. FIG. 11 shows the element-side surface 16 of an optical fiber array 13. FIG. 12 depicts the object-side surface 15 of the optical fiber array 13. As indicated earlier, the LCD 21 (FIG. 7) with a back light is fixed to the element-side surface 16 of the optical fiber array 13, not to move at all. One of the pixels of the LCD, e.g., pixel a (not shown) is turned on, emitting light. This light propagates through one of the single optical fibers of the array 13, i.e., single optical fiber A. The light emerges at position A' on the object-side surface 15 of the single optical fiber A.

To the object-side surface 15 of the single optical fiber A, the CCD 22 (FIG. 7) large enough to cover the object-side surface 15 of the optical fiber array entirely is fixed, not to move at all. Thus, it can be reliably detected that the light beam emitted from one pixel a of the LCD and transmitted through single optical fiber A emerges at position A' on the object-side surface 15. Similarly, it can be precisely detected that the light beam transmitted thorough single optical fiber B emerges at position B' on the object-side surface 15. Likewise, the light beams transmitted through fibers C, D, E, F, G, H, I and J can be reliably detected to emerge at positions C', D', E', F', G', H', I' and J' on the object-side surface 15, respectively. Further, the light beam transmitted through any other single optical fiber shown in FIGS. 11 and 12 can be detected to emerge at a specific position on the object-side surface 15. Hence, the relation between the position each single optical fiber takes on the element-side surface 16 and the position it takes on the object-side surface 15 can be accurately determined. The pixel pitch of the CCD is shorter than the inter-axis pitch of the single optical fibers on the object-side surface 15 of the optical fiber array. This makes it possible to determine correctly which single optical fiber is transmitting light and where the fiber is positioned.

Figure 13:
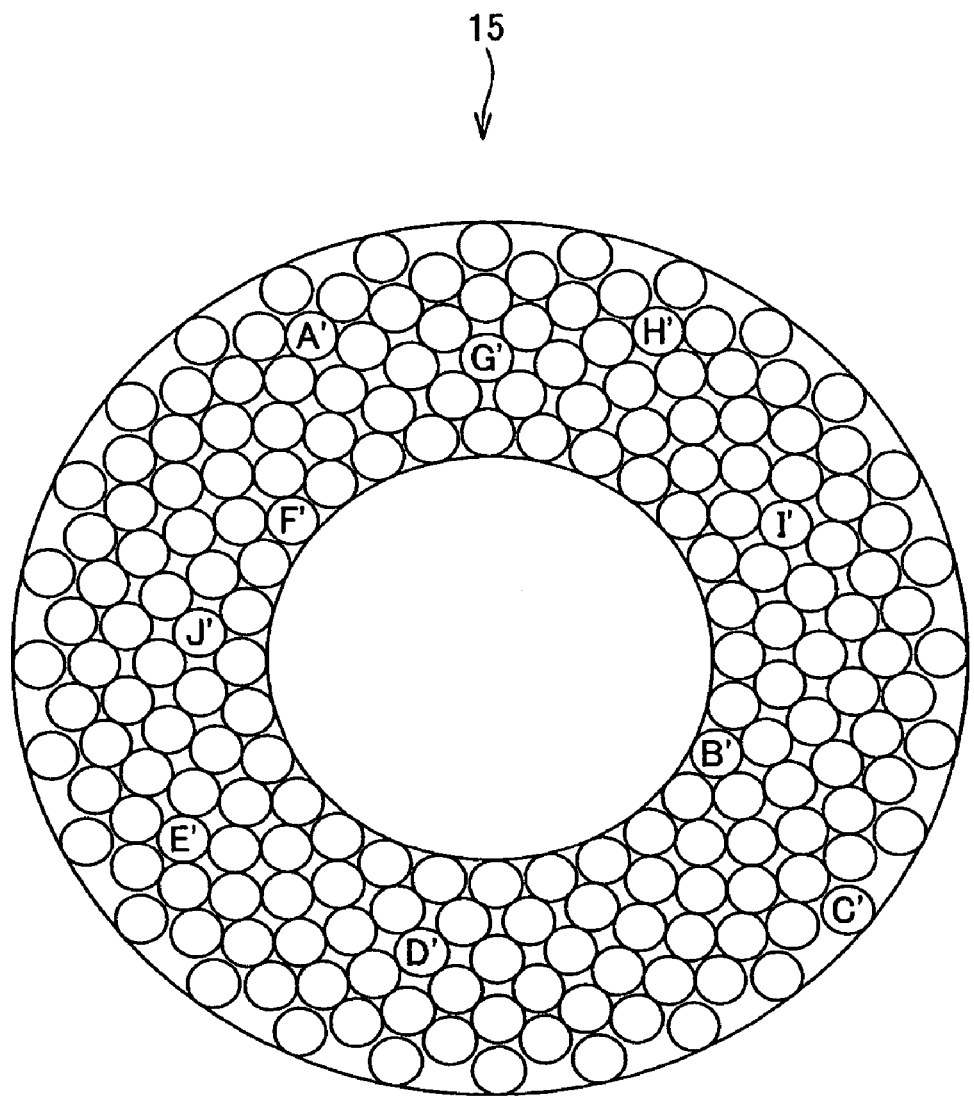
FIG. 13 is a diagram showing the object-side surface of the optical fiber array (in which single optical glass fibers do not lie adjacent)

The present embodiment of the invention can reproduce the image that the camera optical system forms on the object-side surface 15. This is because the image photographed by the CCD 22 (rectangular element) undergoes coordinate conversion that uses the coordinate conversion table prepared by the method described above. In the embodiment, fibers A to E and the corresponding positions A' to E' are adjacent, side by side, and fibers F to J and the corresponding positions F' to J' are adjacent, side by side. Positions A' to J' need not be adjacent, nonetheless. They may be far apart as is illustrated in FIG. 13. This greatly facilitates the manufacture of the optical fiber array 13. Namely, as shown in FIG. 7, the single optical fibers need not be aligned at the object-side surface 15 or the element-side surface 16.

The element-side surface 16 of the optical fiber array is substantially rectangular simply because the imaging element is rectangular. If the imaging element is not rectangular, the element-side surface 16 may have a shape complying with the shape of the imaging element or the shape of the region in which the imaging element is used.

Figure 14:
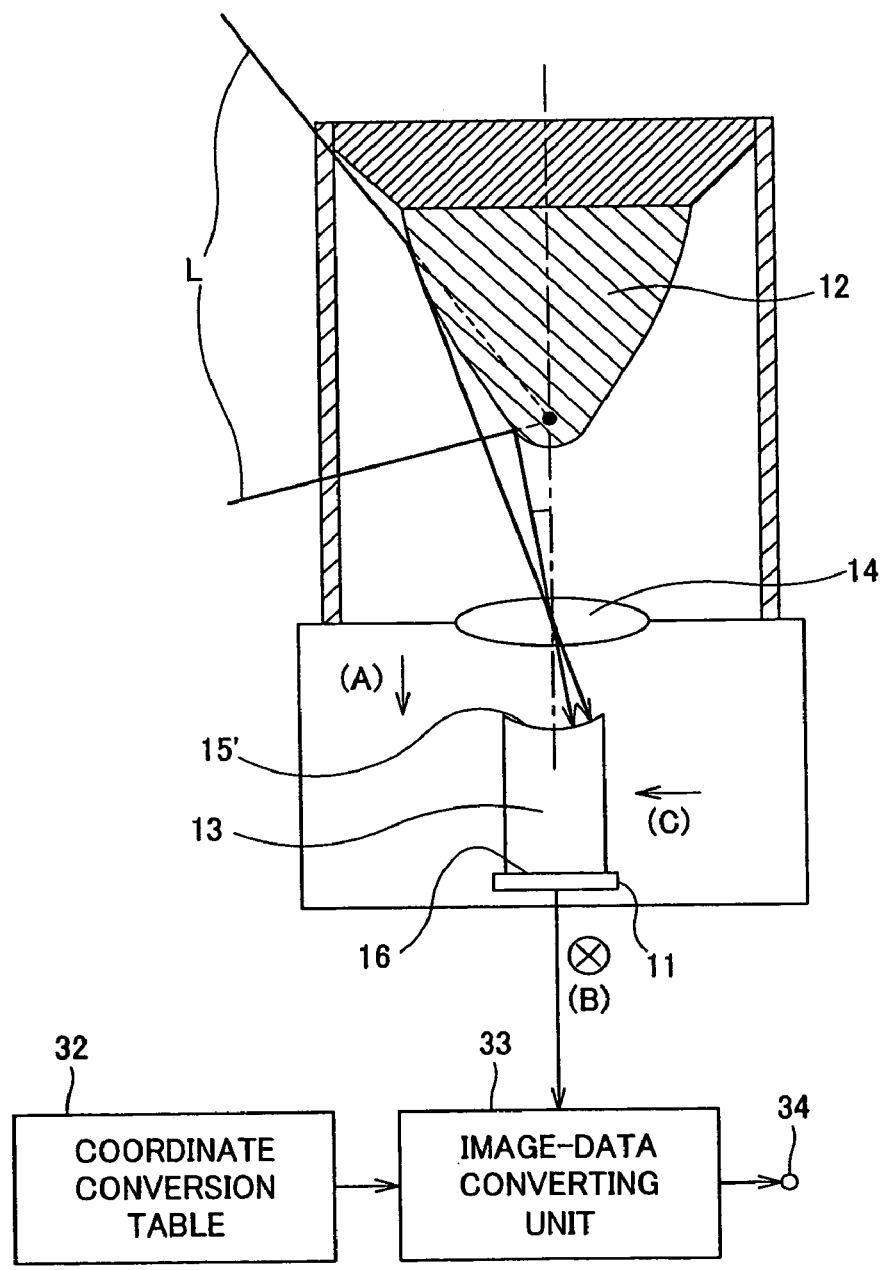
FIG. 14 is a diagram showing the structure of a wide-angle photographing apparatus having an optical fiber array whose object-side surface is curved.

If the photographing lens focuses an image on a curved surface, the object-side surface 15' of the optical fiber array 13 may be curved in compliance with the curved surface, as shown in FIGS. 14 and 15.

The single optical fibers that constitute the optical fiber array 13 may have the same diameter at the object-side surface 15 and element-side surface 16. Alternatively, they may have a diameter at the object-side surface 15 and another diameter at the element-side surface 16. The single optical fibers may be thicker at the element-side surface 16 than at the object-side surface 15. In this case, the image photographed by the imaging element 11 and then subjected to coordinate conversion is larger than the image formed on the input surface (i.e., object-side surface 15) of the optical fiber array 13.

Two imaging elements may be used, one for forming the left half of a wide-angle image, and the other for forming the right half of the wide-angle image. If this is the case, the optical fiber array 13 may be forked into two parts, though its object-side surface 15 remains doughnut-shaped. The optical fibers of each parts of the array 13 are bundled, providing a rectangular element-side surface. In this case, the image-data converting unit 33 may combine the image data items generated by the two imaging elements, providing image data that represents the whole wide-angle image. Instead, the unit 33 may not combine the image data items.

What is claimed is:

1. A photographing apparatus comprising:
   an imaging element;
   a reflecting member provided between an object and the imaging element; and
   an optical fiber array provided between the imaging element and the reflecting member and formed by bundling a plurality of single optical fibers, the apparatus comprising, wherein an image-focusing member is provided between the reflecting member and the optical fiber array, has an annular effective photographing region and forms an annular image in the effective photographing region;
   the optical fiber array has an object-side surface which is doughnut-shaped;
   the optical fiber array has an element-side surface which differs in shape from the object-side surface; and
   image-data converting means for converting image data obtained at the element-side surface in accordance with positions where image signals are acquired at the object-side ends of the single optical fibers which constitute the optical fiber array,
   wherein the element-side surface of the optical fiber array is substantially rectangular.

2. The photographing apparatus according to claim 1, wherein the object-side surface of the optical fiber array is flat.

3. The photographing apparatus according to claim 1, wherein the object-side surface of the optical fiber array is curved.

4. The photographing apparatus according to claim 1, wherein the plurality of single optical fibers constituting the optical fiber array have a diameter at the object-side surface and a different diameter at the element-side surface.

5. A photographing apparatus for photographing wide-angle images, comprising:

an imaging element;

a photographing lens; and an optical fiber array provided between the imaging element and the photographing lens and formed by bundling a plurality of single optical fibers, the apparatus comprising, wherein an image formed in an effective photographing region by an image-focusing member is annular;

the optical fiber array has an object-side surface which is doughnut-shaped;

the optical fiber array has an element-side surface which differs in shape from the object-side surface; and image-data converting means for converting image data obtained at the element-side surface in accordance with positions where image signals are acquired at the object-side surface of the single optical fibers which constitute the optical fiber array, wherein the element-side surface of the optical fiber array is substantially rectangular.

6. The photographing apparatus according to claim 5, wherein the object-side surface of the optical fiber array is flat.

7. The photographing apparatus according to claim 5, wherein the object-side surface of the optical fiber array is curved.

8. The photographing apparatus according to claim 5, wherein plurality of the single optical fibers constituting the optical fiber array have a diameter at the object-side surface and a different diameter at the element-side surface.

\* \* \* \* \*